(12) United States Patent
Liu et al.

(10) Patent No.: US 12,687,654 B2
(45) Date of Patent: Jul. 21, 2026

(54) THREE-COMPONENT AIRBORNE TRANSIENT ELECTROMAGNETIC DETECTION SYSTEM AND METHOD WITH UAV

(71) Applicant: Aerospace Information Research Institute, Chinese Academy of Sciences, Beijing (CN)

(72) Inventors: Lihua Liu, Beijing (CN); Ling Huang, Beijing (CN); Jiankai Li, Beijing (CN); Zhen Ke, Beijing (CN); Shichu Yan, Beijing (CN); Xiaojun Liu, Beijing (CN); Guangyou Fang, Beijing (CN)

(73) Assignee: Aerospace Information Research Institute, Chinese Academy of Sciences, Beijing (CN)

( * ) Notice: Subject to any disclaimer, the term of this patent is extended or adjusted under 35 U.S.C. 154(b) by 184 days.

(21) Appl. No.: 18/372,276

(22) Filed: Sep. 25, 2023

(65) Prior Publication Data

US 2024/0159934 A1 May 16, 2024

(30) Foreign Application Priority Data

Nov. 15, 2022 (CN) .......................... 202211437106.9

(51) Int. Cl.
*G01V 3/165* (2006.01)
*G01V 3/16* (2006.01)

(52) U.S. Cl.
CPC ................ *G01V 3/165* (2013.01); *G01V 3/16* (2013.01)

(58) Field of Classification Search
CPC .......... G01V 3/10; G01V 3/101; G01V 3/102; G01V 3/104; G01V 3/105; G01V 3/107;
(Continued)

(56) References Cited

U.S. PATENT DOCUMENTS 6,541,966 B1* 4/2003 Keene ...................... G01V 3/08
324/225
8,400,157 B2* 3/2013 Kuzmin ................. G01V 3/165
324/331
(Continued)

FOREIGN PATENT DOCUMENTS

CN 111596371 A * 8/2020 ............. G01N 21/84

*Primary Examiner* — David M Schindler
(74) *Attorney, Agent, or Firm* — Bayramoglu Law Offices LLC

(57) ABSTRACT

A system and a method are provided. The system includes an airborne detection system and a ground assistance system. The airborne detection system includes an unmanned aerial vehicle, a receiving device, a transmitting device, and a connecting device. The transmitting device includes a transmitting sub-device, a transmitting coil, and a bucking coil. The receiving device includes a receiving sub-device and a three-component magnetic sensor. The connecting device includes a signal and rope composite cable and is used to connect the UAV, the transmitting device, and the receiving device. The three-component magnetic sensor is used to acquire three-component electromagnetic data. The bucking coil is disposed on an inner side of the transmitting coil, and coil winding direction of the transmitting coil and the bucking coil causes current directions flowing through the transmitting coil and the bucking coil to be opposite to each other, to reduce an electromagnetic interference.

7 Claims, 6 Drawing Sheets

(58) Field of Classification Search
CPC . G01V 3/108; G01V 3/15; G01V 3/16; G01V 3/165
See application file for complete search history.

(56) References Cited

U.S. PATENT DOCUMENTS

| | | | |
|---|---|---|---|
| 2003/0169045 A1 * | 9/2003 | Whitton | G01V 3/16 |
| | | | 324/330 |
| 2010/0188089 A1 * | 7/2010 | Kuzmin | G01V 3/165 |
| | | | 324/330 |
| 2019/0018165 A1 * | 1/2019 | McManamon | G01V 1/44 |
| 2020/0371265 A1 * | 11/2020 | De Barros Braga | G01V 3/081 |

* cited by examiner

1

THREE-COMPONENT AIRBORNE TRANSIENT ELECTROMAGNETIC DETECTION SYSTEM AND METHOD WITH UAV

CROSS-REFERENCE TO RELATED APPLICATION(S)

This application claims the benefit of Chinese Patent Application No. 202211437106.9 filed on Nov. 15, 2022, the whole disclosure of which is incorporated herein by reference.

TECHNICAL FIELD

The present disclosure relates to a field of electromagnetic detection technology, and in particular to a three-component airborne transient electromagnetic detection system and method with unmanned aerial vehicle (UAV).

BACKGROUND

With a gradual development of the economy and society, urban underground space has been increasingly developed and utilized, leading to the construction of numerous artificial infrastructures (such as civil air defense, subways, various pipelines, etc.). To ensure the safe and continued development of the underground space, it is necessary to detect physical performance parameters of underground space and acquire a structural image of underground facilities.

At present, the detection of the underground space mainly adopts electromagnetic detection technology. A traditional ground electromagnetic detection technology involves transmitting an electromagnetic field signal on the ground and obtaining underground space information based on received secondary electromagnetic field signal data. The ground electromagnetic detection technology is susceptible to interference from terrain and is not suitable for detecting underground spaces in complex terrain conditions.

SUMMARY

In view of this, the present disclosure provides a three-component airborne transient electromagnetic detection system and method with UAV.

In one aspect, the present disclosure provides a three-component airborne transient electromagnetic detection system with UAV, which includes an airborne detection system and a ground assistance system, wherein the airborne detection system includes: a UAV; a receiving device comprising a receiving sub-device and a three-component magnetic sensor; a transmitting device comprising a transmitting sub-device, a transmitting coil, and a bucking coil; and a connecting device comprising a signal and rope composite cable, wherein the connecting device is used to connect the UAV, the transmitting device, and the receiving device; wherein the three-component magnetic sensor is used to acquire three-component electromagnetic data, the bucking coil is disposed on an inner side of the transmitting coil, and a coil winding direction of the transmitting coil and the bucking coil is such that a current direction flowing through the transmitting coil is opposite to that flowing through the bucking coil, so as to reduce an electromagnetic interference of the transmitting device to the receiving device.

According to the embodiments of the present disclosure, the three-component magnetic sensor includes: a first receiving coil, wherein a plane on which the first receiving coil is located forms a first plane, and a direction perpendicular to the first plane forms a first component; a second receiving coil, wherein a plane on which the second receiving coil is located forms a second plane, and a direction perpendicular to the second plane forms a second component; and a third receiving coil, wherein a plane on which the third receiving coil is located forms a third plane, and a direction perpendicular to the third plane forms a third component; wherein the first receiving coil, the second receiving coil, and the third receiving coil are fixedly connected through buckles, and each two components of the first component, the second component, and the third component are perpendicular, so as to acquire the three-component electromagnetic data; and wherein the three-component electromagnetic data includes electromagnetic data acquired on the first component, the second component, and the third component.

According to the embodiments of the present disclosure, the receiving sub-device includes: a first acquisition circuit for acquiring the three-component electromagnetic data from the three-component magnetic sensor; a second acquisition circuit for acquiring a transmitting current signal; and a receiving master control circuit that executes a preset receiving instruction to acquire, transmit, and store electromagnetic data form the receiving device.

According to the embodiments of the present disclosure, the receiving sub-device further includes: a signal conditioning circuit for filtering and amplifying the acquired three-component electromagnetic data; a storage circuit for storing the three-component electromagnetic data and the transmitting current signal; a transmission circuit for transmitting the electromagnetic data from the three-component magnetic sensor to the receiving sub-device, and from the receiving sub-device to the ground assistance system; and a low-power power conversion circuit for converting a DC voltage to a second preset voltage, so as to provide power to the receiving sub-device.

According to the embodiments of the present disclosure, the transmitting coil and the bucking coil are disposed in a same plane, a shape of each of the transmitting coil and the bucking coil is constructed into a ring, and the transmitting coil is located in a same plane as one of the first receiving coil, the second receiving coil, or the third receiving coil of the three-component magnetic sensor.

According to the embodiments of the present disclosure, the transmitting sub-device includes: a power inverter circuit that generates the transmitting current signal with a preset frequency and amplitude and load the transmitting current signal into the transmitting coil; a driving circuit that controls the power inverter circuit to generate the transmitting current signal with the preset frequency and amplitude; a detection circuit that detects a waveform of the transmitting current signal; and a high-power power conversion circuit that converts a DC voltage to a third preset voltage, so as to supply power to circuits in the power inverter circuit, the driving circuit, and the transmitting sub-device.

According to the embodiments of the present disclosure, the transmitting sub-device further includes: a transmitting master control circuit that executes a preset transmitting instruction to excite an electromagnetic field of the transmitting device; a synchronous circuit that synchronizes instructions between the transmitting device and the receiving device; and a constant-voltage double-clamp circuit that simultaneously clamps a rising edge and a falling edge of the transmitting current signal to reduce a turn-off time of a circuit; wherein the rising edge represents a time period during which the current signal rises from zero to a preset current, the falling edge represents a time period during which the current signal drops from the preset current to zero, the clamp represents that a voltage of the current signal is limited to a first preset voltage, and the turn-off time represents a duration information of the falling edge.

According to the embodiments of the present disclosure, the transmitting master control circuit includes a waveform control unit that controls the constant-voltage double-clamp circuit and the driving circuit, so as to generate a preset transmitting current signal.

According to the embodiments of the present disclosure, the airborne detection system further includes: a positioning device for performing a real-time positioning on the airborne detection system, so as to obtain a real-time position information of the airborne detection system; and a power supply device for supplying power to the airborne detection system; wherein the ground assistance system includes a monitoring device, such as a monitor, for real-time monitoring electromagnetic data and the position information of the airborne detection system.

In another aspect, the present disclosure provides a three-component airborne transient electromagnetic detection method with UAV, which is applied to the three-component airborne transient electromagnetic detection system with UAV. The method includes: performing a safety flight test on the airborne detection system, so as to ensure safe flight during detection operations; setting, based on specific detection requirements, detection parameters and flight parameters of the three-component airborne transient electromagnetic detection system with UAV, wherein the detection parameters include an amplitude and a frequency of the transmitting current, and a sampling frequency, and the flight parameters include a flight altitude, a flight velocity, and a flight route; executing a preset transmitting instruction and a preset receiving instruction, so that the three-component airborne transient electromagnetic detection system with UAV performs detection operations on a target detection site according to the established requirement, wherein the detection operations involve acquiring and storing the three-component electromagnetic data and the transmitting current signal; and performing a data processing on the three-component electromagnetic data and the transmitting current signal, so as to obtain an underground space information of the target detection site.

According to the embodiments of the present disclosure, the electromagnetic data in three directions may be acquired through the three-component magnetic sensor, which leads to a more complete understanding of the underground space by analyzing the obtained electromagnetic data. The use of a bucking coil in the transmitting device reduces electromagnetic field interference on the receiving device, resulting in more accurate and reliable electromagnetic data. After acquiring the electromagnetic data, the electromagnetic data is transmitted and stored through the receiving device for subsequent data analysis to obtain the underground space information. Therefore, the three-component airborne transient electromagnetic detection system based on the UAV overcomes the limitations of traditional ground electromagnetic detection technology, which is susceptible to interference from terrain and cannot detect underground spaces in complex terrain conditions. This system achieves the transmission of electromagnetic field signals and the reception of three-component electromagnetic data in the air, improving the applicability and accuracy of underground space detection.

BRIEF DESCRIPTION OF THE DRAWINGS

The above and other objectives, features and advantages of the present disclosure will be clearer through following descriptions of embodiments of the present disclosure with reference to the accompanying drawings, in which.

DETAILED DESCRIPTION OF EMBODIMENTS

Figure 1:
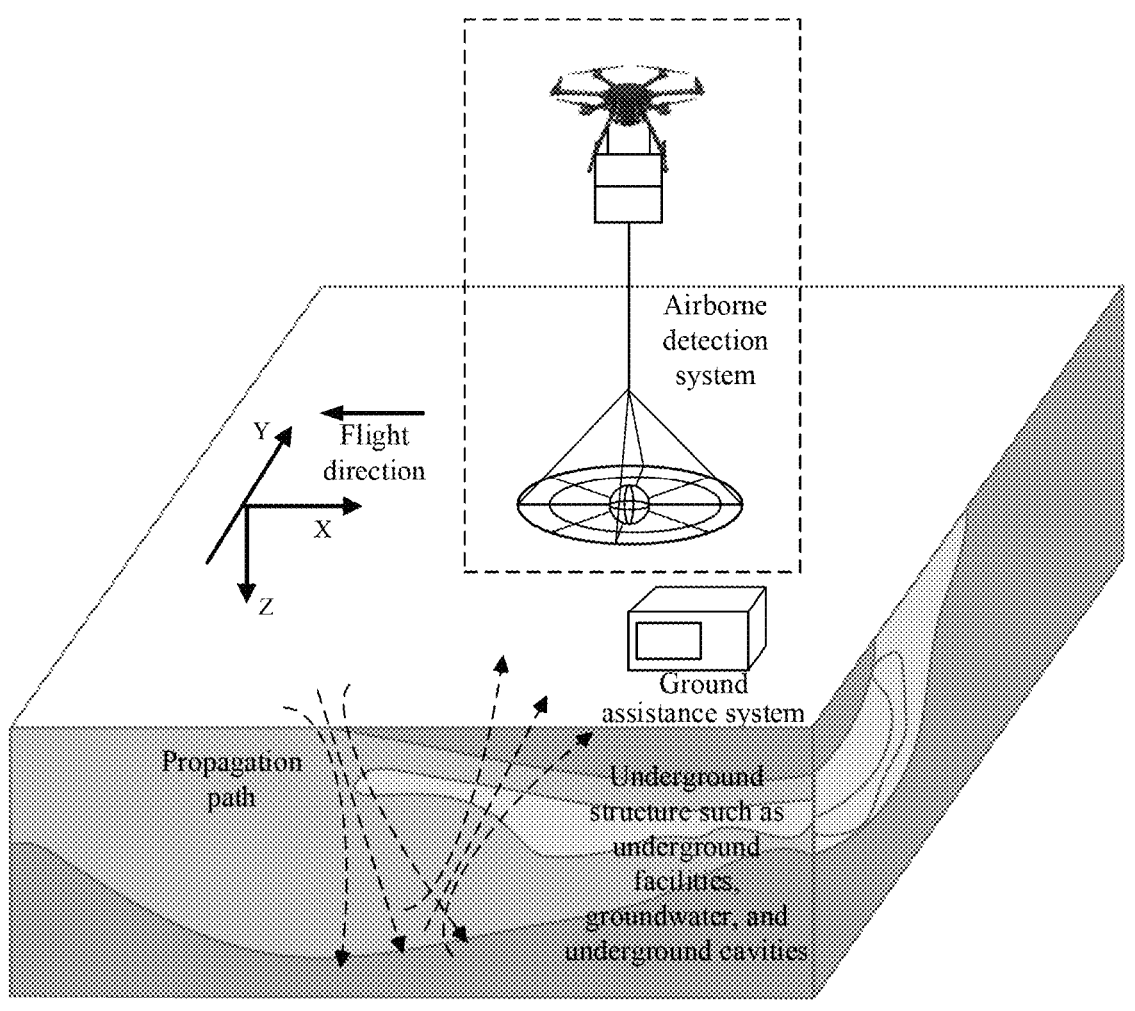
FIG. 1 schematically shows a diagram of a working scenario of a three-component airborne transient electromagnetic detection system with UAV according to the embodiments of the present disclosure.

Embodiments of the present disclosure will be described below with reference to the accompanying drawings. It should be understood, however, that these descriptions are merely exemplary and are not intended to limit the scope of the present disclosure. In the following detailed description, for ease of interpretation, many specific details are set forth to provide a comprehensive understanding of embodiments of the present disclosure. However, it is clear that one or more embodiments may also be implemented without these specific details. In addition, in the following description, descriptions of well-known structures and technologies are omitted to avoid unnecessarily obscuring the concepts of the present disclosure.

Terms used herein are for the purpose of describing specific embodiments only and are not intended to limit the present disclosure. The terms "including", "containing", etc. used herein indicate the presence of the feature, step, operation and/or component, but do not exclude the presence or addition of one or more other features, steps, operations or components.

All terms (including technical and scientific terms) used herein have the meanings generally understood by those skilled in the art, unless otherwise defined. It should be noted that the terms used herein shall be interpreted to have meanings consistent with the context of this specification, and shall not be interpreted in an idealized or overly rigid manner.

In a case of using the expression similar to "at least one of A, B and C", it should be explained according to the meaning of the expression generally understood by those skilled in the art (for example, "a system including at least one of A, B and C" should include but not be limited to a system including A alone, a system including B alone, a system including C alone, a system including A and B, a system including A and C, a system including B and C, and/or a system including A, B and C). In a case of using the expression similar to "at least one of A, B or C", it should be explained according to the meaning of the expression generally understood by those skilled in the art (for example, "a system including at least one of A, B or C" should include but not be limited to a system including A alone, a system including B alone, a system including C alone, a system including A and B, a system including A and C, a system including B and C, and/or a system including A, B and C).

With a gradual development of the economy and society, urban underground space has been increasingly developed and utilized, leading to the construction of numerous artificial infrastructures (such as civil air defense, subways, various pipelines, etc.). However, these infrastructures also bring safety hazards such as various underground caves formed by humans or nature, voids or soft structures under the ground. Therefore, to ensure the safe and continued development of the underground space, it is crucial to detect physical performance parameters of underground space and acquire a structural image of underground facilities, so as to ensure safer urban underground space development.

At present, the detection of the underground space mainly adopts electromagnetic detection technology. A traditional ground electromagnetic detection technology involves transmitting an electromagnetic field signal on the ground, receiving secondary electromagnetic field signal data, and obtaining the underground space information by analyzing and processing the secondary electromagnetic field signal data. However, the ground electromagnetic detection technology is susceptible to interference from terrain and is not suitable for detecting underground spaces in complex terrain conditions. In addition, semi-aviation electromagnetic detection technology, which involves transmitting the electromagnetic field signal on the ground and receiving the secondary electromagnetic field signal data in the air, is also unable to detect the underground space in complex terrain conditions.

In view of this, the embodiments of the present disclosure provide a three-component airborne transient electromagnetic detection system and method with UAV, which are used to at least partially overcome the above problems.

FIG. 1 schematically shows a diagram of a working scenario of a three-component airborne transient electromagnetic detection system with UAV according to the embodiments of the present disclosure.

As shown in FIG. 1, the three-component airborne transient electromagnetic detection system with UAV of the embodiments of the present disclosure includes an airborne detection system and a ground assistance system, which may be used to detect underground space structures to obtain the underground space information including an underground space image. Specifically, the three-component airborne transient electromagnetic detection system with UAV transmits an electromagnetic field signal (also known as a primary electromagnetic field signal) to the surface of the earth. The electromagnetic field signal has good penetrability and may cause electromagnetic induction of underground structures such as underground facilities, groundwater, and underground cavities through the surface of the earth. An electromagnetic induction signal (also known as a secondary electromagnetic field signal) of the underground structure may pass through the surface of the earth and be received by the airborne detection system. The underground space information including the underground space image may be obtained by analyzing the received secondary electromagnetic field signal data.

Figure 3:
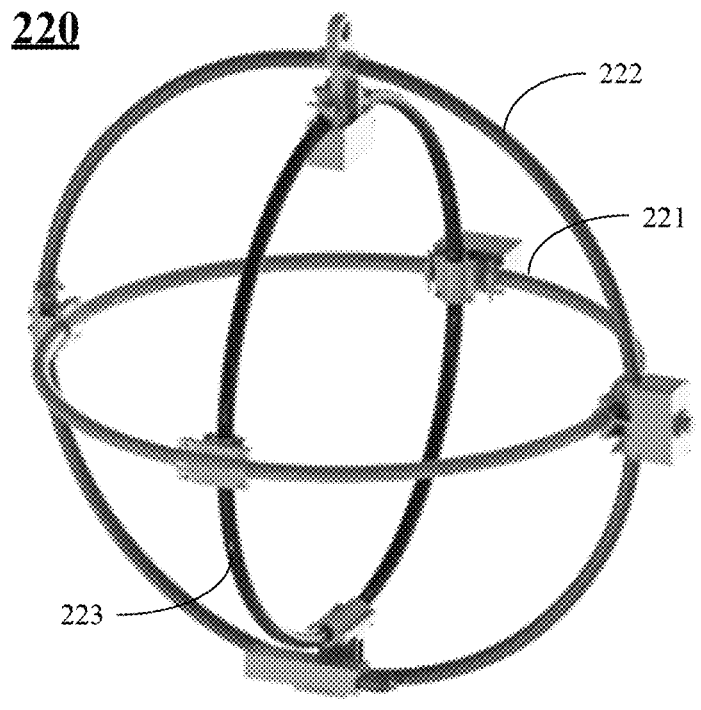
FIG. 3 schematically shows a structural diagram of a three-component magnetic sensor according to the embodiments of the present disclosure.

According to the embodiments of the present disclosure, the airborne detection system of the three-component airborne transient electromagnetic detection system with UAV may be equipped with a three-component magnetic sensor, so that the airborne detection system may receive the secondary electromagnetic field signal in three component directions perpendicular to each other. In a specific embodiment, as shown in FIG. 3, the secondary electromagnetic field signal in the three component directions perpendicular to each other may be X and Y components that are perpendicular to each other in a horizontal direction, and a Z component in a vertical direction.

Figure 2:
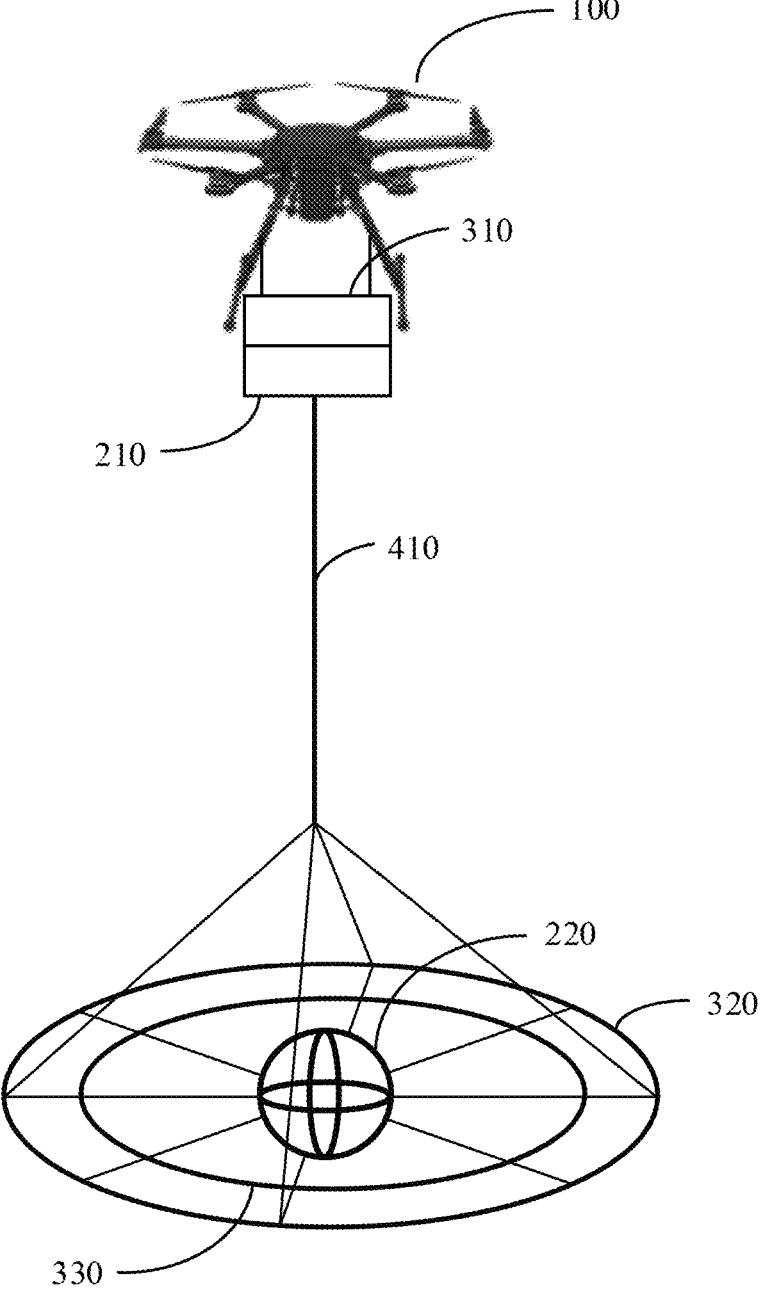
FIG. 2 schematically shows a structural diagram of an airborne detection system of a three-component airborne transient electromagnetic detection system with UAV according to the embodiments of the present disclosure.

FIG. 2 schematically shows a structural diagram of an airborne detection system of a three-component airborne transient electromagnetic detection system with UAV according to the embodiments of the present disclosure.

As shown in FIG. 2, the airborne detection system may include a UAV 100, a receiving device, a transmitting device, and a connecting device.

According to the embodiments of the present disclosure, as shown in FIG. 2, the UAV 100 is a flight device of the airborne detection system that carries the transmitting device and the connecting device to achieve flight, so that the airborne detection system may detect a specific site along a target detection path. The UAV 100 may be a convenient flight device that can be easily controlled by staff, and the specific form and structure of the UAV are not limited here.

According to the embodiments of the present disclosure, as shown in FIG. 2, the receiving device comprises a receiving sub-device 210 and a three-component magnetic sensor 220, which are used to acquire, transmit, and store data of the secondary electromagnetic field signal. The receiving sub-device 210 may be a receiver, such as a multi-channel receiver. In a specific embodiment, the receiving sub-device 210 may be fixed below the UAV 100 through a latch, so that the UAV 100 may carry the receiving sub-device 210 for operation.

According to the embodiments of the present disclosure, as shown in FIG. 2, the transmitting device includes a transmitting sub-device 310, a transmitting coil 320, and a bucking coil 330, which are used to transmit a primary electromagnetic field signal to the surface of the earth. The transmitting sub-device 310 may be a transmitter. In a specific embodiment, the transmitting sub-device 310 may be fixed below the UAV 100 through a latch, so that the UAV 100 may carry the transmitting sub-device 310 for operation.

According to the embodiments of the present disclosure, the bucking coil 330 may be disposed on an inner side of the transmitting coil 320, and a coil winding direction of the transmitting coil 320 and the bucking coil 330 causes a current direction flowing through the transmitting coil 320 to be opposite to that of the bucking coil 330, so as to reduce an electromagnetic interference of the transmitting device to the receiving device 200.

According to the embodiments of the present disclosure, as shown in FIG. 2, the transmitting coil 320 may be formed by overlapping multiple turns of metal wires and surrounded by an insulating material.

According to the embodiments of the present disclosure, as shown in FIG. 2, the connecting device may include a signal and rope composite cable 410.

According to the embodiments of the present disclosure, the transmitting coil 320 may be placed below the UAV 100 through the signal and rope composite cable 410. The transmitting coil 320 is connected to the transmitting sub-device 310 through the signal and rope composite cable 410 for an excitation of the primary electromagnetic field signal.

According to the embodiments of the present disclosure, a material of the metal wire of the transmitting coil 320 may be a metal material including copper, and the material of the metal wire of the transmitting coil 320 is not limited here.

According to the embodiments of the present disclosure, the transmitting device of the three-component airborne transient electromagnetic detection system with UAV achieves the excitation of the primary electromagnetic field signal through a center loop primary field compensation technology.

According to the embodiments of the present disclosure, the electromagnetic data in three directions may be acquired through the three-component magnetic sensor, which leads to a more complete understanding of the underground space by analyzing the obtained electromagnetic data. The use of a bucking coil in the transmitting device reduces electromagnetic field interference on the receiving device, resulting in more accurate and reliable electromagnetic data. After acquiring the electromagnetic data, the electromagnetic data is transmitted and stored through the receiving device for subsequent data analysis to obtain the underground space information. Therefore, the three-component airborne transient electromagnetic detection system with UAV overcomes the limitations of traditional ground electromagnetic detection, which is susceptible to interference from terrain and cannot detect underground spaces in complex terrain conditions. This system achieves the transmission of electromagnetic field signals and the reception of three-component electromagnetic data in the air, improving the applicability and accuracy of underground space detection.

FIG. 3 schematically shows a structural diagram of a three-component magnetic sensor according to the embodiments of the present disclosure.

As shown in FIG. 3, the three-component magnetic sensor 220 includes a first receiving coil 221, a second receiving coil 222, and a third receiving coil 223.

A plane on which the first receiving coil 221 is located forms a first plane, and a direction perpendicular to the first plane forms a first component.

A plane on which the second receiving coil 222 is located forms a second plane, and a direction perpendicular to the second plane forms a second component.

A plane on which the third receiving coil 223 is located forms a third plane, and a direction perpendicular to the third plane forms a third component.

According to the embodiments of the present disclosure, the first receiving coil 221, the second receiving coil 222, and the third receiving coil 223 are fixedly connected through buckles, and each two components of the first component, the second component, and the third component are perpendicular, so as to acquire the three-component electromagnetic data. The three-component electromagnetic data includes electromagnetic data acquired on the first component, the second component, and the third component.

According to the embodiments of the present disclosure, the magnetic field sensor is a device that may convert various magnetic fields and their changes into an electrical signal that it outputs, and may serve as a carrier of various information. Therefore, the magnetic field sensor may detect various information carried in the magnetic field.

According to the embodiments of the present disclosure, the magnetic field sensor in FIG. 3 includes three coils. Any one of these coils may be referred to as the first receiving coil 221, while either of the other two coils can be referred to as the second receiving coil 222. The specific reference relationships of the first receiving coil 221, the second receiving coil 222, and the third receiving coil 223 in the magnetic field sensor are not limited here.

In a schematic embodiment, in order to better explain the structure of the magnetic field sensor of the present disclosure, for example, a coil located on a horizontal plane may be designated as the first receiving coil 221, and a first component formed in a direction (i.e. a vertical direction) perpendicular to the horizontal plane may be designated as a Z component. Second and third components perpendicular to the Z component may be designated as X and Y components, respectively, with X and Y components also being perpendicular to each other. Therefore, the magnetic field sensor in this embodiment may be used to acquire the electromagnetic data on the X, Y, and Z components, where the Z component represents the electromagnetic data in the vertical direction and the X and Y components represent the electromagnetic data in the horizontal direction.

According to the embodiments of the present disclosure, shapes of the first receiving coil 221, the second receiving coil 222, and the third receiving coil 223 may be set to circular, square, etc., while their sizes may be set according to the detection requirements. The shapes and sizes of the first receiving coil 221, the second receiving coil 222, and the third receiving coil 223 are not limited here.

In a schematic embodiment, the shapes of the first receiving coil 221, the second receiving coil 222, and the third receiving coil 223 are all set as circles with diameters less than 1 m, so that a wind resistance of the magnetic field sensor in a flight state is reduced and the magnetic field sensor is better adapt to the airborne operation of the airborne transient electromagnetic detection system with UAV.

According to the embodiments of the present disclosure, the first receiving coil 221, the second receiving coil 222, and the third receiving coil 223 may all be formed by overlapping N-turn coils, and N is a natural number. A material of the N-turn coils may be a metal material including copper. The materials of the first receiving coil 221, the second receiving coil 222, and the third receiving coil 223 are not limited here.

According to the embodiments of the present disclosure, the first receiving coil 221, the second receiving coil 222, and the third receiving coil 223 are fixedly connected through buckles. A fixing position of the buckle may be provided at the connection between the first receiving coil 221, the second receiving coil 222, and the third receiving coil 223. The buckle may limit the relative displacement and rotation between the first receiving coil 221, the second receiving coil 222, and the third receiving coil 223, so that any two components of the first component, the second component, and the third component remain perpendicular to each other, so as to acquire three-component electromagnetic data that meets target detection requirements.

According to the embodiments of the present disclosure, by using the three-component magnetic sensor, not only does the sensor structure appear lightweight and miniaturized, but also electromagnetic data in the three component directions perpendicular to each other may be acquired, resulting in more comprehensive electromagnetic data. Furthermore, when using the three-component magnetic sensor for underground space detection, more comprehensive and accurate underground space information may be obtained by analyzing the three-component electromagnetic data detected by the three-component magnetic sensor, thereby improving the accuracy of underground space detection. In addition, the three-component magnetic sensor achieves a high-precision observation of a broadband transient electromagnetic response signal through a low noise design and capacitance compensation technology.

Figure 4:
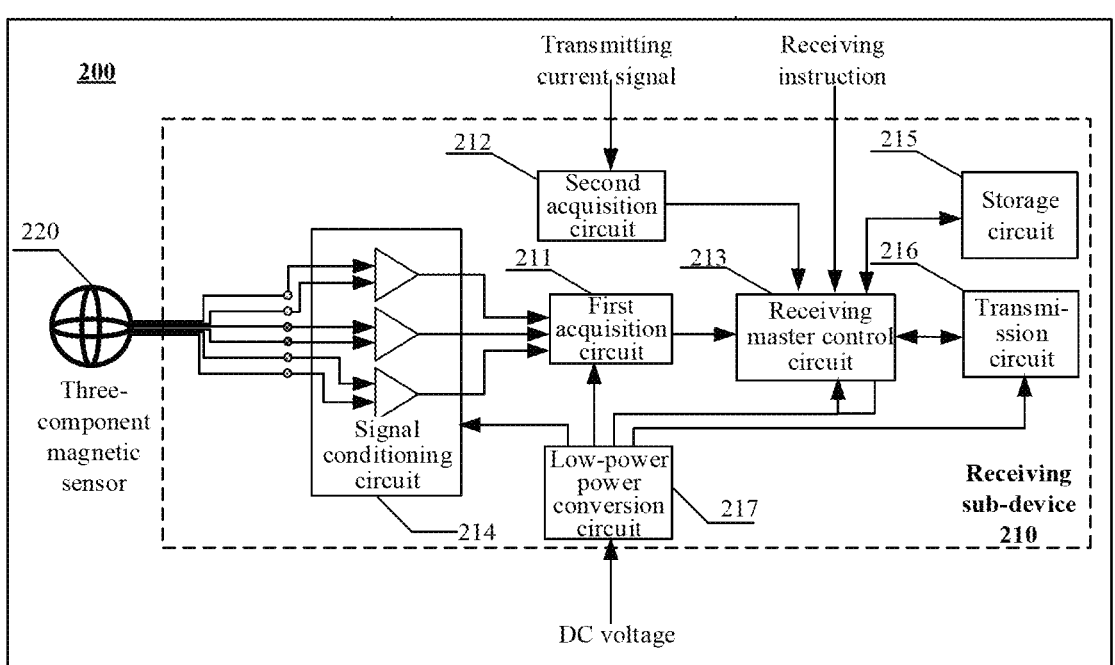
FIG. 4 schematically shows a block diagram of a receiving device according to the embodiments of the present disclosure.

FIG. 4 schematically shows a block diagram of a receiving device according to the embodiments of the present disclosure.

As shown in FIG. 4, the receiving device 200 may include a receiving sub-device 210 and a three-component magnetic sensor 220. The receiving sub-device 210 includes a first acquisition circuit 211, a second acquisition circuit 212, and a receiving master control circuit 213.

The first acquisition circuit 211 is used to acquire the three-component electromagnetic data from the three-component magnetic sensor.

The second acquisition circuit 212 is used to acquire a transmitting current signal.

The receiving master control circuit 213 is used to execute a preset receiving instruction to acquire, transmit, and store electromagnetic data from the receiving device.

According to the embodiments of the present disclosure, the receiving device 200 for the three-component airborne transient electromagnetic detection with UAV may be applied in the field of the airborne transient electromagnetic detection technology with UAV. The airborne transient electromagnetic detection technology with UAV may transmit the electromagnetic field signal in the air, receive the secondary electromagnetic field signal data in the air, and analyze the secondary electromagnetic field signal data to obtain the underground space information. The receiving device 200 used for the three-component airborne transient electromagnetic detection with UAV may receive the secondary electromagnetic field signal data in the three component directions perpendicular to each other in the air.

According to the embodiments of the present disclosure, the three-component magnetic sensor 220 is used to acquire the three-component electromagnetic data, which may characterize the secondary electromagnetic field signal data in the three component directions perpendicular to each other. In response to the preset receiving instruction, the receiving sub-device 210 may acquire the three-component electromagnetic data obtained by the three-component magnetic sensor 220 and the transmitting current signal, and store them for further analysis.

According to the embodiments of the present disclosure, in response to receiving an acquisition instruction transmitted by the master control circuit 213 for acquiring the three-component electromagnetic data, the first acquisition circuit 211 may execute the acquisition instruction to achieve a real-time acquisition of the three-component electromagnetic data of the three-component magnetic sensor.

According to the embodiments of the present disclosure, during the airborne transient electromagnetic detection with UAV, it is necessary to first transmit the electromagnetic field signal in the air, and the electromagnetic field signal may be generated by an excitation of the current signal transmitted by the transmitting device. In response to receiving an acquisition instruction transmitted by the master control circuit 213 for acquiring the transmitting current signal, the second acquisition circuit 212 may execute the acquisition instruction to achieve a real-time acquisition of the transmitting current signal.

According to the embodiments of the present disclosure, the first acquisition circuit 211 and the second acquisition circuit 212 may be data sampling circuits of the analog digital converter.

According to the embodiments of the present disclosure, the receiving master control circuit 213 belongs to a core control module of the receiving sub-device 210. For example, the receiving master control circuit 213 may be a controller such as a chip. The staff may preset the receiving instruction before the detection system starts working. After the detection system starts working, the receiving master control circuit 213 may execute the preset receiving instruction and control the first acquisition circuit 211, the second acquisition circuit 212, the storage circuit, and the transmission circuit, so as to acquire, transmit and store the electromagnetic data by the receiving device 200, the electromagnetic data includes the three-component electromagnetic data and the transmitting current signal.

According to the embodiments of the present disclosure, as shown in FIG. 4, the receiving sub-device 210 further includes a signal conditioning circuit 214, a storage circuit 215, a transmission circuit 216, and a low-power power conversion circuit 217.

The signal conditioning circuit 214 is used to filter and amplify the acquired three-component electromagnetic data. For example, the signal conditioning circuit 214 may include an amplifier and a filter.

The storage circuit 215 is used to store the three-component electromagnetic data and the transmitting current signal. For example, the storage circuit 215 may be a RAM data storage circuit.

The transmission circuit 216 is used to transmit the electromagnetic data from the three-component magnetic sensor to the receiving sub-device, and from the receiving sub-device to the ground assistance system.

The low-power power conversion circuit 217 is used to convert a DC voltage to a second preset voltage, so as to provide power to the receiving sub-device. The low-power conversion circuit 217 may be a DC-DC low-power power converter, such as a DC-DC voltage converter.

According to the embodiments of the present disclosure, the three-component electromagnetic data acquired by the three-component magnetic sensor usually contains various types of noise, which is not conducive to the final imaging effect of electromagnetic detection. The present disclosure utilizes the signal conditioning circuit 214 to filter and amplify the acquired three-component electromagnetic data, which may greatly reduce the noise of the three-component electromagnetic data acquired by the first acquisition circuit 211, improve a signal-to-noise ratio (SNR) of the detection data and the final imaging effect of electromagnetic detection.

According to the embodiments of the present disclosure, in response to receiving a storage instruction transmitted by the master control circuit 213 for storing the electromagnetic data, the storage circuit 215 may execute the storage instruction to achieve a real-time storage of the electromagnetic data. The electromagnetic data includes the three-component electromagnetic data and the transmitting current signal.

According to the embodiments of the present disclosure, in response to receiving a transmission instruction transmitted by the master control circuit 213 for transmitting the electromagnetic data, the transmission circuit 216 may execute the transmission instruction to achieve a real-time transmission of the electromagnetic data. The electromagnetic data includes the three-component electromagnetic data and the transmitting current signal.

According to the embodiments of the present disclosure, the receiving device 200 may be powered by a DC power supply, so as to drive the receiving device to work. A normal working voltage of the receiving device is the second preset voltage, which may be a 24V DC voltage. Through the low-power power conversion circuit 217, the voltage of the DC power supply may be converted to the second preset voltage to provide power to the receiving sub-device, so as to ensure a normal operation of the receiving device.

According to the embodiments of the present disclosure, after the three-component magnetic sensor acquiring the electromagnetic data, the electromagnetic data and the transmitting current signal are transmitted and stored through the receiving device, so as to obtain the underground space information including the underground space image after subsequent data analysis.

Figure 5:
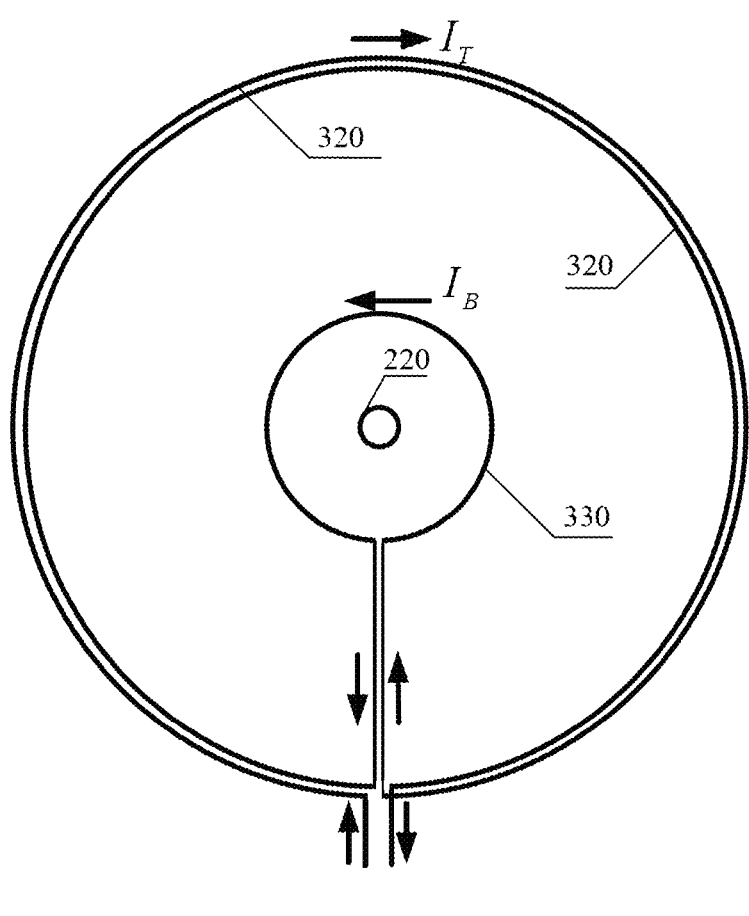
FIG. 5 schematically shows a diagram of a center loop primary field compensation technology of a three-component airborne transient electromagnetic detection system with UAV according to the embodiments of the present disclosure.

FIG. 5 schematically shows a diagram of a center loop primary field compensation technology of a three-component airborne transient electromagnetic detection system with UAV according to the embodiments of the present disclosure.

As shown in FIG. 5, the bucking coil 330 is disposed on an inner side of the transmitting coil 320, and a coil winding direction of the transmitting coil 320 and the bucking coil 330 causes a current direction IT flowing through the transmitting coil 320 to be opposite to a current direction IB flowing through the bucking coil 330. The bucking coil 330 may effectively offset a strong primary field in the secondary electromagnetic field signal received by the three-component magnetic sensor 220 through this setting, so as to achieve a weak coupling between the transmitting and receiving coils and reduce the electromagnetic field interference of the transmitting device to the receiving device.

Figures 6A, 6B, 6C, 7:
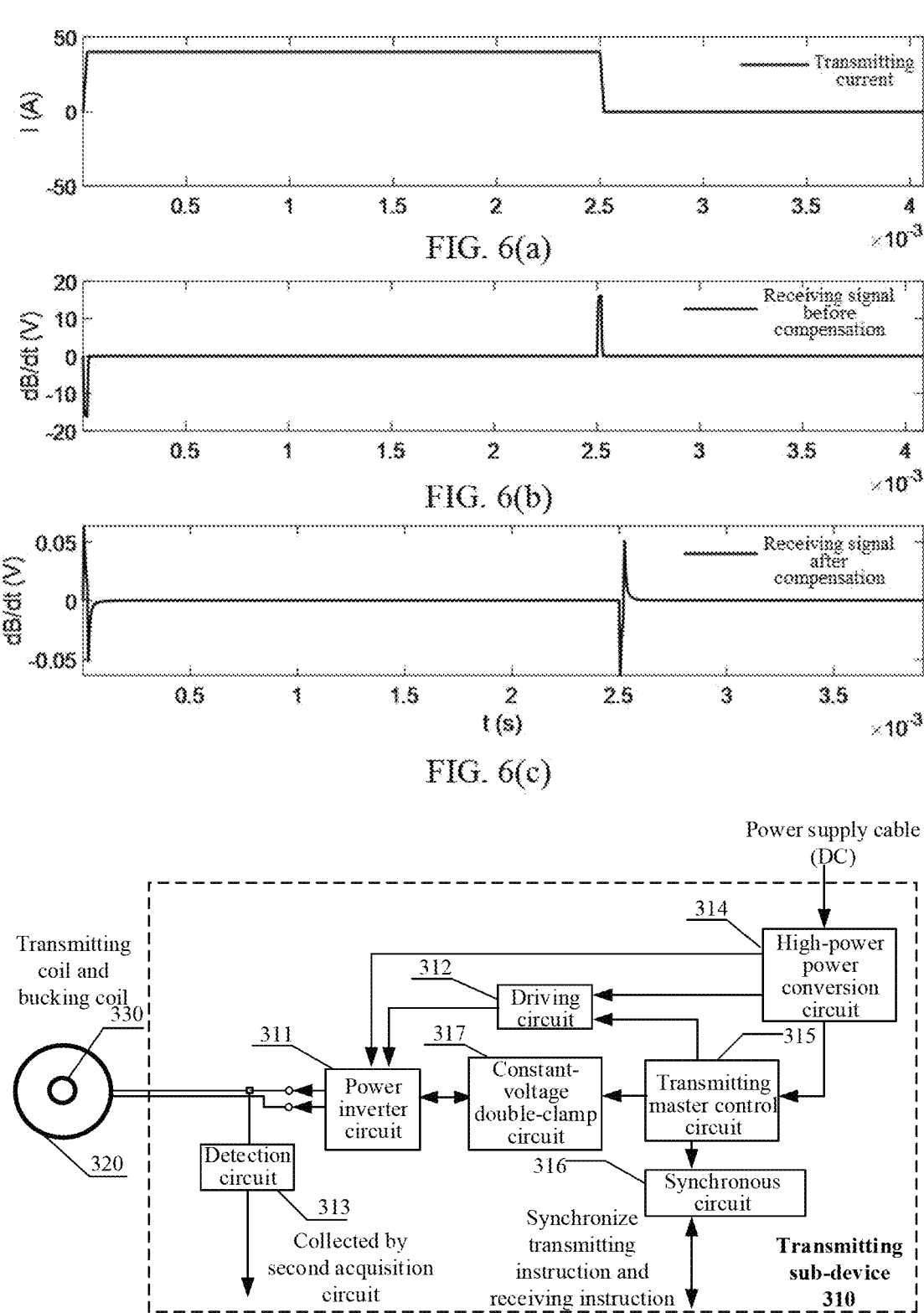
FIG. 6(a)-FIG. 6(c) schematically show a comparison effect between diagrams before and after center loop primary field compensation technology processing according to the embodiments of the present disclosure.
FIG. 7 schematically shows a block diagram of a transmitting sub-device of a three-component airborne transient electromagnetic detection system with UAV according to the embodiments of the present disclosure.

FIG. 6(a)-FIG. 6(c) schematically shows a comparison effect between diagrams before and after center loop primary field compensation technology processing according to the embodiments of the present disclosure.

FIG. 6(a) represents a curve of the magnitude of the transmitting current signal over time, FIG. 6(b) represents a curve of the magnitude of a secondary electromagnetic field receiving signal over time on the z component before the primary field compensation, and FIG. 6(c) represents a curve of the magnitude of the secondary electromagnetic field receiving signal over time on the z component after the primary field compensation. Comparing the results before and after compensation, it may be seen that the magnitude of the secondary electromagnetic field receiving signal on the z component is significantly weakened, which is conductive to reducing a dynamic range of the sensor and improving the quality of an early-time attenuation signal. Furthermore, the receiving device may obtain relatively pure secondary field data, and a clearer underground space image may be obtained by processing the electromagnetic data.

According to the embodiments of the present disclosure, the transmitting coil 320 and the bucking coil 330 are disposed in a same plane, a shape of each of the transmitting coil 320 and the bucking coil 330 is constructed into a ring, and the transmitting coil 320 is located in a same plane as one of the first receiving coil 221, the second receiving coil 222, or the third receiving coil 223 of the three-component magnetic sensor 220.

According to the embodiments of the present disclosure, shapes of the transmitting coil 320 and the bucking coil 330 may be set to ring, square, etc., and sizes of the transmitting coil 320 and the bucking coil 330 may be set according to the detection requirements. The shapes and sizes of the transmitting coil 320 and the bucking coil 330 are not limited here.

In a schematic embodiment, the shape of the transmitting coil 320 is set as a ring with a radius between 1 m to 2 m, so that the wind resistance of the magnetic field sensor in the flight state is reduced and the magnetic field sensor is better adapt to the airborne transient electromagnetic detection system with UAV.

According to the embodiments of the present disclosure, the transmitting coil 320 and the bucking coil 330 are disposed in a same plane, and the transmitting coil 320 is located in a same plane as one of the first receiving coil 221, the second receiving coil 222, or the third receiving coil 223 of the three-component magnetic sensor 220, so that the coil system has a good aerodynamic performance, maintaining a stable state during operation, and the airborne transient electromagnetic detection system with UAV has a good detection performance.

FIG. 7 schematically shows a block diagram of a transmitting sub-device of a three-component airborne transient electromagnetic detection system with UAV according to the embodiments of the present disclosure.

According to the embodiments of the present disclosure, the transmitting sub-device 310 includes a power inverter circuit 311, a driving circuit 312, a detection circuit 313, and a high-power power conversion circuit 314.

The power inverter circuit 311 is used to generate a transmitting current signal with a preset frequency and amplitude, and load the transmitting current signal into transmitting coil 320.

The driving circuit 312 is used to control the power inverter circuit to generate the transmitting current signal with the preset frequency and amplitude.

The detection circuit 313 is used to detect a waveform of the transmitting current signal.

The high-power power conversion circuit 314 is used to convert a DC voltage to a third preset voltage, so as to provide power to the power inverter circuit, the driving circuit, and the transmitting sub-device.

According to the embodiments of the present disclosure, the power inverter circuit 311 may generate a transmitting current signal with a preset frequency and amplitude. The preset frequency and amplitude may be set according to the detection requirements.

In a schematic embodiment, a range of the preset frequency is 0.1 Hz to 10 kHz, and a range of the preset current amplitude is 0 to 50 A. The power inverter circuit 311 may be a MOSFET (Metal-Oxide-Semiconductor Field-Effect Transistor) power inverter circuit.

According to the embodiments of the present disclosure, the driving circuit 312 may control the power inverter circuit to generate the transmitting current signal with the preset frequency and amplitude.

In a schematic embodiment, the driving circuit 312 may be a MOSFET driving circuit.

According to the embodiments of the present disclosure, the detection circuit 313 is used to detect a waveform of the transmitting current signal. The transmitting current signal may be a current pulse signal. After the detection circuit detects the waveform of the transmitting current signal, the waveform of the transmitting current signal is acquired by the second acquisition circuit 212 in the receiving device.

According to the embodiments of the present disclosure, the high-power power conversion circuit 314 is connected to the power supply device through a cable, so as to convert the DC voltage in the power supply device to a third preset voltage. The third preset voltage may include a voltage range of 12V to 90V, so as to supply power to the power inverter circuit 311, the driving circuit 312, and the transmitting sub-device. For example, the high-power power conversion circuit 314 may be a DC-DC high-power power converter, such as a DC-DC voltage converter.

According to the embodiments of the present disclosure, the transmitting sub-device 310 further includes a transmitting master control circuit 315, a synchronous circuit 316, and a constant-voltage double-clamp circuit 317.

The transmitting master control circuit 315 is used to execute a preset transmitting instruction to excite an electromagnetic field of the transmitting device.

The synchronous circuit 316 is used to synchronize an instruction of the transmitting device and that of the receiving device.

The constant-voltage double-clamp circuit 317 is used to simultaneously clamp a rising edge and a falling edge of a transmitting current signal to reduce a turn-off time of a circuit. The rising edge represents a time period during which the current signal rises from zero to a preset current, the falling edge represents a time period during which the current signal drops from the preset current to zero, the clamp represents that a voltage of the current signal is limited to a first preset voltage, and the turn-off time represents a duration information of the falling edge.

According to the embodiments of the present disclosure, the transmitting master control circuit 315 belongs to a core control module of the transmitting sub-device 310. For example, the transmitting master control circuit 315 may be a controller such as a chip. The staff may preset the transmitting instruction before the detection system starts working. After the detection system starts working, the transmitting master control circuit 315 may execute the preset transmitting instruction to excite the electromagnetic field of the transmitting device. Specifically, the transmitting instruction may include a transmitting time sequence and a magnitude of the transmitting current.

According to the embodiments of the present disclosure, the synchronous circuit 316 is used to synchronize the instruction of the transmitting device and that of the receiving device, so that the transmitting device and the receiving device may maintain synchronization.

Figure 8:
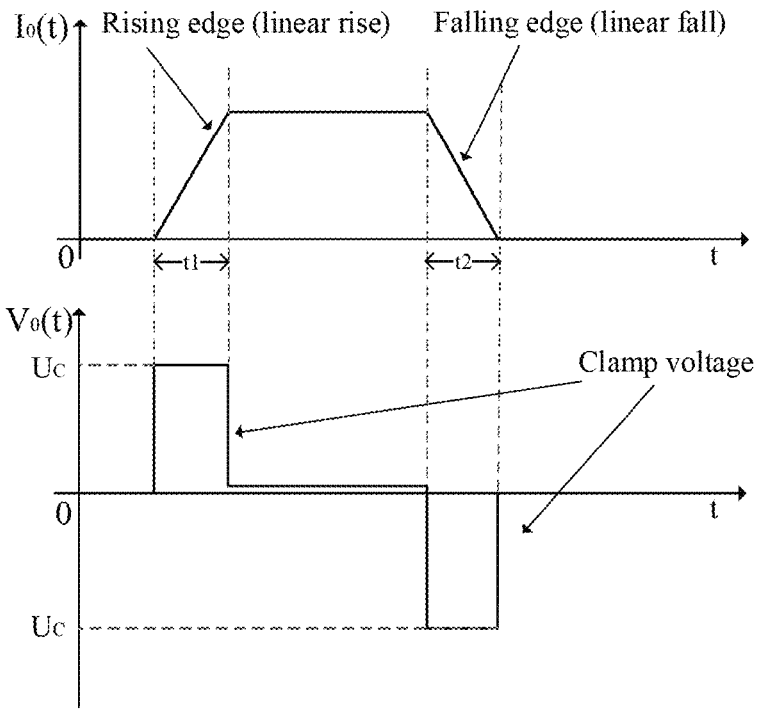
FIG. 8 schematically shows a diagram of a waveform of a transmitting current pulse of a constant-voltage double-clamp circuit of a three-component airborne transient electromagnetic detection system with UAV according to the embodiments of the present disclosure.

FIG. 8 schematically shows a diagram of a waveform of a transmitting current pulse of a constant-voltage double-clamp circuit of a three-component airborne transient electromagnetic detection system with UAV according to the embodiments of the present disclosure.

As shown in FIG. 8, the diagram of the waveform of the transmitting current pulse of the constant-voltage double-clamp circuit includes a rising edge, a flat top segment, and a falling edge. The rising edge represents a time period during which the current signal rises from zero to a preset current flat top segment, the falling edge represents a time period during which the current signal drops from the preset current flat top segment to zero, $t_1$ represents a rising edge time of the pulse, and $t_2$ represents a falling edge time of the pulse. The clamp represents that a voltage of the current signal is limited to a first preset voltage Uc, which may have a range from 500V to 1000V. The constant-voltage double-clamp circuit may use a constant-voltage double-clamp method to clamp the rising and falling edges of the current simultaneously, so as to achieve a rapid turn-on of the rising edge of the current and a rapid turn-off of the falling edge of the current.

According to the embodiments of the present disclosure, the transmitting master control circuit includes a waveform control unit, and the waveform control unit is used to control the constant-voltage double-clamp circuit and the driving circuit, so as to generate a preset transmitting current signal.

According to the embodiments of the present disclosure, the waveform control unit may control the waveform of the transmitting current signal according to the detection requirements, so as to ensure that the transmitting current signal is transmitted according to the requirement.

According to the embodiments of the present disclosure, the airborne detection system further includes a positioning device and a power supply device. The positioning device on the airborne detection system is used to perform a real-time positioning, so as to obtain a real-time position information. The power supply device is used to provide power to the airborne detection system.

According to the embodiments of the present disclosure, the ground assistance system includes a measurement and control system. According to the embodiments of the present disclosure, the ground assistance system includes a monitoring device. The monitoring device is used to real-time monitor electromagnetic data and the position information of the airborne detection system.

In a schematic embodiment, the positioning device may be a GPS positioning device, and the power supply device may be a battery that provides a DC power. Both the positioning device and the power supply device may be disposed on the UAV through a latch, so as to ensure a reliable connection between them.

According to the embodiments of the present disclosure, the monitoring device may real-time monitor electromagnetic data and the position information of the airborne detection system, so that the staff may acquire the latest electromagnetic data and position information as a basis for adjusting the flight route.

According to the embodiments of the present disclosure, the three-component airborne transient electromagnetic detection system based on the UAV achieves the transmission of the electromagnetic field signal in the air and the reception of the three-component electromagnetic data in the air, which at least partially overcomes the problem that the traditional ground electromagnetic detection technology is susceptible to interference from terrain and cannot detect the underground space in complex terrain conditions, thereby improving the applicability and accuracy of underground space detection.

Figure 9:
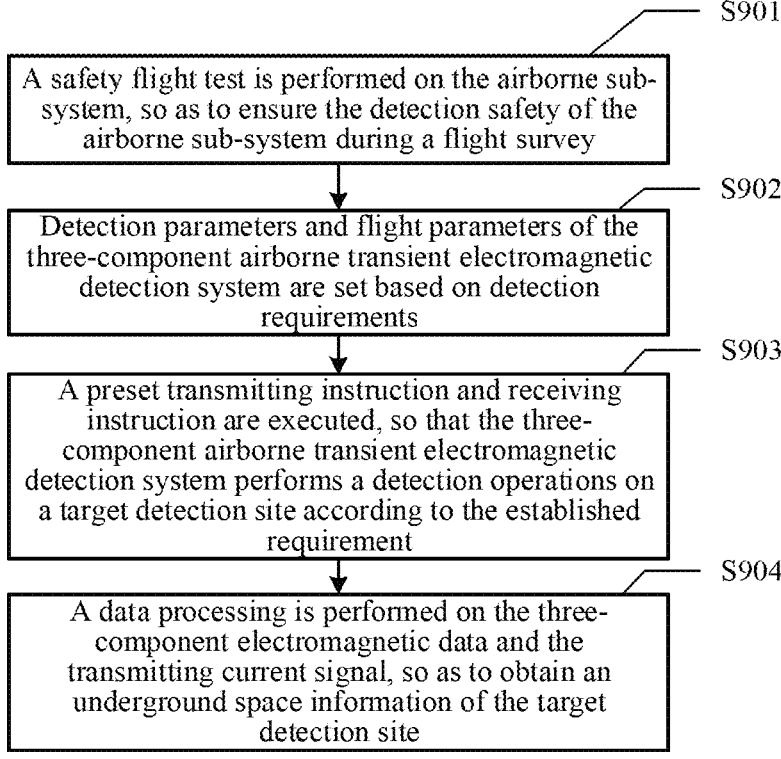
FIG. 9 schematically shows a flowchart of a three-component airborne transient electromagnetic detection method with UAV according to the embodiments of the present disclosure.

FIG. 9 schematically shows a flowchart of a three-component airborne transient electromagnetic detection method with UAV according to the embodiments of the present disclosure.

As shown in FIG. 9, the three-component airborne transient electromagnetic detection method with unmanned airborne vehicle includes operations S901 to S904.

In operation S901, a safety flight test is performed on the airborne detection system, so as to ensure a detection safety of the airborne detection system during a flight survey.

In operation S902, detection parameters and flight parameters of the three-component airborne transient electromagnetic detection system with UAV are set based on detection requirements, wherein the detection parameters include an amplitude and a frequency of a transmitting current, and a sampling frequency, and the flight parameters include a flight altitude, a flight velocity, and a flight route.

In operation S903, a preset transmitting instruction and receiving instruction are executed, so that the three-component airborne transient electromagnetic detection system with UAV performs detection operations on a target detection site according to the established requirement, wherein the detection operations involve acquiring and storing the three-component electromagnetic data and a transmitting current signal.

In operation S904, a data processing is performed on the three-component electromagnetic data and the transmitting current signal, so as to obtain an underground space information of the target detection site.

According to the embodiments of the present disclosure, the operation S901 may include system installation and self-inspection. Specifically, the transmitting coil and the three-component magnetic sensor are suspended below the UAV through the signal and rope composite cable, and the transmitting device and the receiving device are fixed to an abdomen of the UAV. The self-inspection is performed on the transmitting device, the receiving device, and the UAV in sequence, and the UAV is started for a flight safety test to eliminate a potential flight accident and ensure a smooth progress of the detection operations. If there are no malfunctions, proceed directly to the next step. If there is a malfunction, troubleshoot and proceed to the next step.

According to the embodiments of the present disclosure, the operation of S902 may include setting the detection system parameters and the flight parameters. The detection system parameters include the amplitude and the frequency of the transmitting current, and the sampling frequency. The sampling frequency is a frequency of signal acquisition, which may have a range from 100 kHz to 1 MHz. The flight parameters include the flight altitude, the flight velocity, and the flight route.

In a schematic embodiment, the flight altitude may be greater than 10 m, and a range of the flight velocity may be 1 m/s to 6 m/s. A user may adjust the detection system parameters and the flight parameters according to the requirement, so as to improve data quality.

According to the embodiments of the present disclosure, the operation S903 may include system operation and data acquisition. The staff presets the transmitting instruction and the receiving instruction, synchronizes the transmitting system and the receiving system, and connects the positioning device. The UAV operates on a pre-planned measurement route and achieves synchronous acquisition and storage of the transmitting current signal and the three-component electromagnetic data.

According to the embodiments of the present disclosure, the operation S904 may include comprehensive data processing and analysis. After finishing the detection, the data stored in the storage circuit is imported into a data processing platform for data processing and analysis. The data processing platform may be a MATLAB software processing program. Furthermore, a joint interpretation of the three-component electromagnetic data is achieved through a resistivity inversion imaging method, so as to acquire high-resolution and relatively clear underground space information. The resistivity inversion imaging method uses an electromagnetic data processing algorithm to image a resistivity distribution about the underground media.

Those skilled in the art may understand that various embodiments of the present disclosure and/or features described in the claims may be combined in various ways, even if such combinations are not explicitly described in the present disclosure. In particular, the various embodiments of the present disclosure and/or the features described in the claims may be combined in various ways without departing from the spirit and teachings of the present disclosure. All these combinations fall within the scope of the present disclosure.

The specific embodiments mentioned above provide a further detailed explanation of the objective, technical solution, and beneficial effects of the present disclosure. It should be understood that the above are only specific embodiments of the present disclosure and are not intended to limit the present disclosure. Any modifications, equivalent replacements, improvements, etc. made within the spirit and principles of the present disclosure should be included in the scope of protection of the present disclosure.

What is claimed is:

1. A three-component airborne transient electromagnetic detection system with a UAV, comprising an airborne detection system and a ground assistance system, wherein the airborne detection system comprises:

the UAV;

a receiving device comprising a three-component magnetic sensor and a receiving sub-device, wherein the three-component magnetic sensor is configured to acquire three-component electromagnetic data, and wherein the receiving sub-device comprises: a first acquisition circuit configured to acquire the three-component electromagnetic data from the three-component magnetic sensor; a second acquisition circuit configured to acquire a transmitting current signal; a receiving master control circuit comprising a controller; and a transmission circuit configured to transmit the three-component electromagnetic data and the transmitting current signal; wherein the first acquisition circuit and the second acquisition circuit comprise data sampling circuits of an analog-to-digital converter, and wherein the transmission circuit is configured to transmit the three-component electromagnetic data and the transmitting current signal to the ground assistance system;

a transmitting device comprising a transmitting coil, a bucking coil, and a transmitting sub-device, wherein the bucking coil is disposed on an inner side of the transmitting coil, and a coil winding direction of the transmitting coil and a coil winding direction of the bucking coil cause a current direction flowing through the transmitting coil to be opposite to a current direction flowing through the bucking coil, so as to reduce an electromagnetic interference of the transmitting device to the receiving device, wherein the transmitting sub-device comprises;

a detection circuit configured to detect a waveform of the transmitting current signal, wherein the transmitting current signal is a current pulse signal; a transmitting master control circuit comprising a controller; a synchronous circuit configured to synchronize an instruction of the transmitting device and an instruction of the receiving device; and a constant-voltage double-clamp circuit configured to simultaneously clamp a rising edge and a falling edge of the transmitting current signal to reduce a turn-off time of a circuit;

a connecting device comprising a signal and rope composite cable, wherein the connecting device is configured to connect the UAV, the transmitting device, and the receiving device;

wherein the rising edge represents a time period during which the current signal rises from zero to a preset current, the falling edge represents a time period during which the current signal drops from the preset current to zero, the clamp represents that a voltage of the current signal is limited to a first-preset voltage, and the turn-off time represents a duration information of the falling edge.

2. The system according to claim 1, wherein the three-component magnetic sensor comprises:

a first receiving coil, wherein a plane on which the first receiving coil is located forms a first plane, and a direction perpendicular to the first plane is a first direction;

a second receiving coil, wherein a plane on which the second receiving coil is located forms a second plane, and a direction perpendicular to the second plane is a second direction; and a third receiving coil, wherein a plane on which the third receiving coil is located forms a third plane, and a direction perpendicular to the third plane is a third direction;

wherein the first receiving coil, the second receiving coil, and the third receiving coil are fixedly connected through buckles, and each two directions of the first direction, the second direction, and the third direction are perpendicular, so as to acquire the three-component electromagnetic data; and wherein the three-component electromagnetic data comprises electromagnetic data acquired in the first direction, the second direction, and the third direction.

3. The system according to claim 1, wherein the receiving sub-device further comprises:

a signal conditioning circuit configured to filter and amplify the acquired three-component electromagnetic data;

a storage circuit configured to store the three-component electromagnetic data and the transmitting current signal; and a low-power power conversion circuit configured to convert a DC voltage to a preset voltage, so as to provide power to the receiving device.

4. The system according to claim 2, wherein the transmitting coil and the bucking coil are disposed in a same plane, each of the transmitting coil and the bucking coil is constructed into a ring, and the transmitting coil is in a same plane as one of the first receiving coil, the second receiving coil, or the third receiving coil of the three-component magnetic sensor.

5. The system according to claim 4, wherein the transmitting sub-device comprises:

a power inverter circuit configured to generate the transmitting current signal with a preset frequency and amplitude and load the transmitting current signal into the transmitting coil;

a driving circuit configured to control the power inverter circuit to generate the transmitting current signal with the preset frequency and amplitude; and a high-power power conversion circuit configured to convert a DC voltage to a preset voltage, so as to provide power to the power inverter circuit, the driving circuit, and the transmitting device.

6. The system according to claim 1, wherein the airborne detection system further comprises:

a positioning device configured to perform a real-time positioning on the airborne detection system, so as to obtain a real-time position information of the airborne detection system; and a power supply device configured to provide power to the airborne detection system;

wherein the ground assistance system comprises:

an airborne detection system monitoring device configured to real-time monitor electromagnetic data and the position information of the airborne detection system.

7. A three-component airborne transient electromagnetic detection method, applied to the three-component airborne transient electromagnetic detection system with the UAV of claim 1, wherein the method comprises:

performing a safety flight test on the airborne detection system, so as to ensure a detection safety of the airborne detection system during a flight survey;

setting detection parameters and flight parameters of the three-component airborne transient electromagnetic detection system with the UAV, wherein the detection parameters comprise an amplitude and a frequency of a transmitting current, and a sampling frequency, and the flight parameters comprise a flight altitude, a flight velocity, and a flight route, wherein the frequency is in a range of 0.1 Hz to 10 kHz, the amplitude is in a range of 0 A to 50 A, the sampling frequency is in a range of 100 kHz to 1 MHz, the flight altitude is greater than 10 m, and the flight velocity is in a range of 1 m/s to 6 m/s;

performing, at a target detection site, data acquisition comprising: transmitting, by the transmitting device, the transmitting current signal through the transmitting coil; acquiring, by the three-component magnetic sensor, the three-component electromagnetic data; and storing, by the receiving device the three-component electromagnetic data and the transmitting current signal.

\* \* \* \* \*